Nov. 12, 1940.    T. S. HODGINS ET AL    2,221,708
PREPARATION OF UREA-FORMALDEHYDE RESIN
Filed April 20, 1938

Inventor
THEODORE S. HODGINS and
ALMON G. HOVEY

By Munson H. Lane
Attorney

Patented Nov. 12, 1940

2,221,708

UNITED STATES PATENT OFFICE 2,221,708

PREPARATION OF UREA-FORMALDEHYDE RESIN

Theodore S. Hodgins, Detroit, and Almon G. Hovey, Pleasant Ridge, Mich., assignors, by mesne assignments, to Reichhold Chemicals, Inc., Detroit, Mich., a corporation of Delaware Application April 20, 1938, Serial No. 203,149

1 Claim. (Cl. 260—70)

The invention relates to the preparation of resinous condensation products of the urea formaldehyde type, and to the process of making the same. Such condensation products are clear, water-white, and readily heat convertible, and are especially suitable for use as coating compositions and are compatible with the commonly used paint and varnish solvents, and with most types of commercial alkyd resins, and with nitrocellulose, etc.

According to the present process it is possible to use ordinary 37% aqueous formaldehyde instead of the more expensive anhydrous product.

The formaldehyde is first reacted with urea by refluxing 3 mols of aqueous formaldehyde with 1 mol of urea in the presence of ammonium hydroxide, at boiling temperature until a free formaldehyde test shows that 10% free formaldehyde or 2 mols have reacted at this stage. Thereupon an acid and butyl alcohol are added, and the resulting resin is dehydrated under vacuum.

Figure 1:
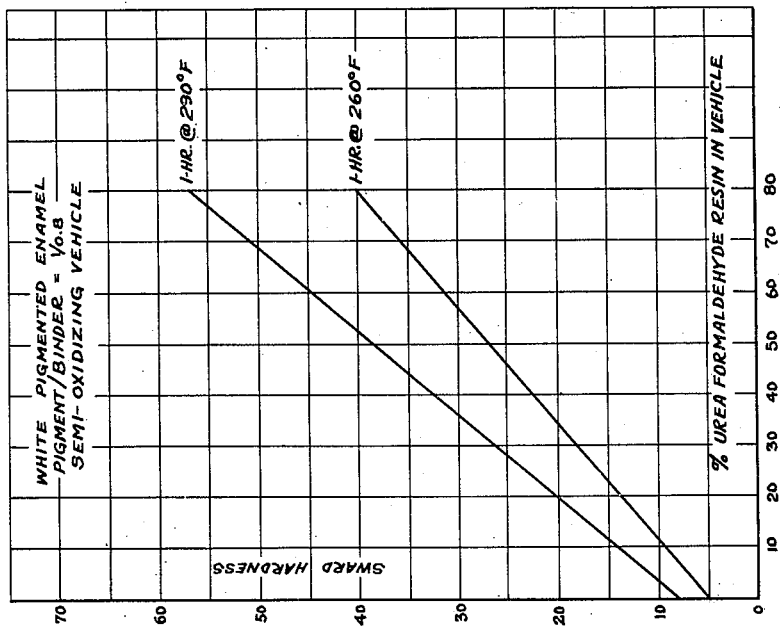
Figure 2:
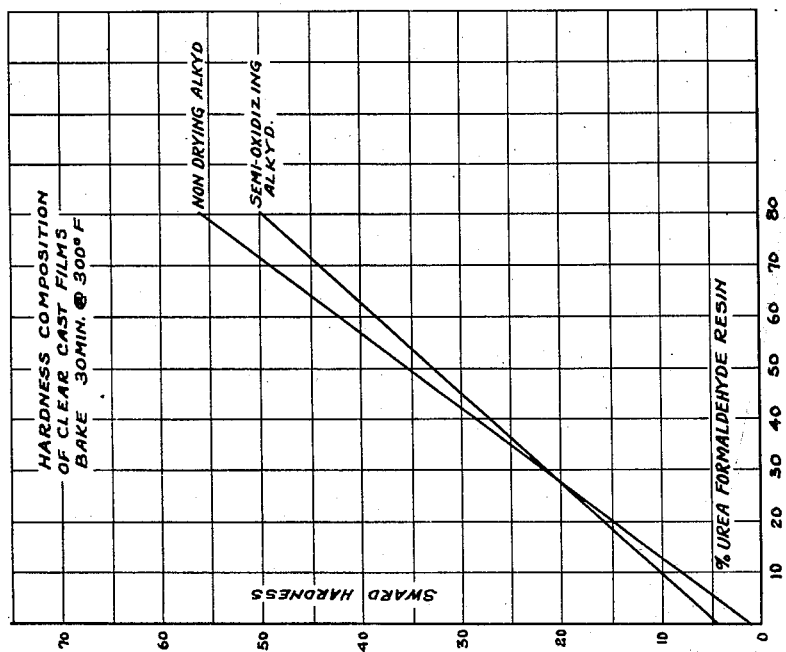

A resin produced in accordance with our invention has extreme hardness and toughness when baked 1 hour at 250°–300° F. It is very useful as a fortifying resin to be added to alkyd resins both in clear and pigmented films to improve hardness and toughness. Figures 1 and 2 of the accompanying drawing show the effect on hardness of the addition of these resins to alkyd resins.

Example

| | Parts by weight |
|---|---|
| Urea | 60 |
| Formaldehyde 37% | 243 |
| Ammonium hydroxide | 5 |
| o-Phosphoric acid 75% | 2.5 |
| Butyl alcohol | 148 |

Reflux the urea, formaldehyde and ammonium hydroxide at boiling for 3 hours. Free formaldehyde test (any standard method such as $H_2O_2$, etc.) shows 10% free formaldehyde or 2 mols reacted at this stage. Add the phosphoric acid and butyl alcohol. Dehydrate the resin under vacuum. Add butyl alcohol or other solvents to obtain desired solid content. The resulting resin is clear, water-white and readily heat-convertible, having extreme hardness and toughness when subjected to bakes of 1 hour at 250°–300° F.

We claim:

A process for preparing a hydrocarbon soluble artificial resin of the urea-formaldehyde type, suitable for use in coating compositions, which process comprises refluxing 1 mol of urea with three mols of aqueous formaldehyde, in the presence of aqueous ammonia, at boiling temperature until one mol of urea has reacted with two mols of the formaldehyde, leaving one mol of unreacted formaldehyde, then acidifying the solution by the use of concentrated phosphoric acid, adding two mols of butyl alcohol, and dehydrating under vacuum to produce resin which is clear, water-white, and readily heat convertible, and which possesses extreme hardness and toughness when subjected to bakes of one hour at 250°–300° F.

THEODORE S. HODGINS.
ALMON G. HOVEY.